June 27, 1961 — W. HAUSAMMANN — 2,989,846
SHOCK WAVE SENSING DEVICE
Filed Feb. 12, 1958 — 2 Sheets-Sheet 1

INVENTOR.
WERNER HAUSAMMANN

June 27, 1961 W. HAUSAMMANN 2,989,846
SHOCK WAVE SENSING DEVICE
Filed Feb. 12, 1958 2 Sheets-Sheet 2

INVENTOR.
WERNER HAUSAMMANN

United States Patent Office 2,989,846
Patented June 27, 1961

2,989,846
SHOCK WAVE SENSING DEVICE
Werner Hausammann, Zurich, Switzerland, assignor to Lear, Incorporated
Filed Feb. 12, 1958, Ser. No. 714,921
11 Claims. (Cl. 60—35.6)

This invention relates to the detection of shock waves in air inlets for air breathing engines for supersonic aircraft, and particularly to a device for sensing the position of the shock wave which occurs at the inlet of ducting used to supply air to a ram jet or turbojet engine operated at high speed.

To achieve maximum efficiency from a turbojet or ram jet power plant used in a supersonic aircraft, it is necessary to achieve an optimum pressure recovery in the ducting system. In modern aircraft, the air velocity with respect to the aircraft is supersonic before entering the air inlet duct. The kinetic eenrgy of the air is transformed in the ducting to pressure energy in order that the combustion processes can take place at as high a pressure as possible. The velocity through the combustion chamber is therefore somewhat reduced, and the volume through the combustion chamber is increased so that a relatively high volume-high velocity gas jet is produced, the reaction of which drives the aircraft. To achieve presure recovery, i.e., conversion of the kinetic energy of the air to pressure energy, the position of the shock wave which defines the transition from supersonic to subsonic velocity and the hiatus between low pressure and high pressure, must be fixed at a predetermined point along the axis of air flow. The position of the shock wave may be affected by changing the geometry of the inlet or by changing the pressure in the combustion chamber. The pressure in the combustion chamber may be changed by adjustments in fuel flow or by the use of bleed doors which relieve part of the combustion chamber pressure to the outside atmosphere. The change in pressure and, therefore, density of the air which occurs at the shock wave may be detected optically by Schlieren photographs, and is known to be an abrupt change. The use of ordinary pressure measuring equipment to detect the position of the shock wave is therefore unsatisfactory, as the input to a servo system for controlling the opening of bleed doors or the geometry of the inlet, because an abrupt discontinuity occurs at the shock wave. The use of a sensing device therefore, which reflects this abrupt pressure change, would result in a control signal having an abrupt reversal point at null and no region of proportionality between error signal and shock wave position.

This invention contemplates a device for producing a signal which is smoothly proportional to the displacement of the shock wave from a predetermined position. In other words, the error signal resulting from the device of this invention is proportional to the displacement of the shock wave from some predetermined position over a reasonable range so that the output of the device of this invention may be satisfactorily used to drive a servo device designed to adjust the opening of bleed doors or adjust the geometry of an inlet diffuser to correct the position of the shock wave.

It is therefore an object of this invention to provide means for controlling the position of a shock wave in a duct.

It is another object of this invention to provide means for sensing position of a shock wave in a duct.

Other objects of the invention will become apparent from the following description taken in connection with the accompanying drawings, in which FIG. 1 is a combined schematic and sectional view of the shock wave controlling system of this invention;

Figure 8:
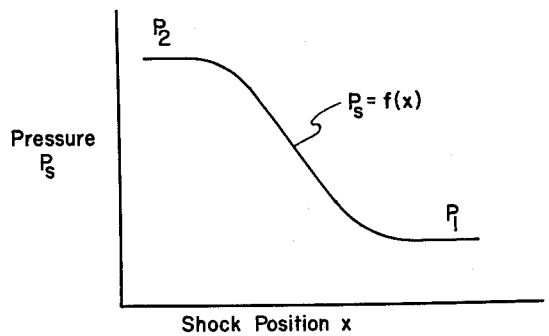

And FIG. 8 is a plot of pressure in the device of this invention plotted against shock wave position.

Figure 1:
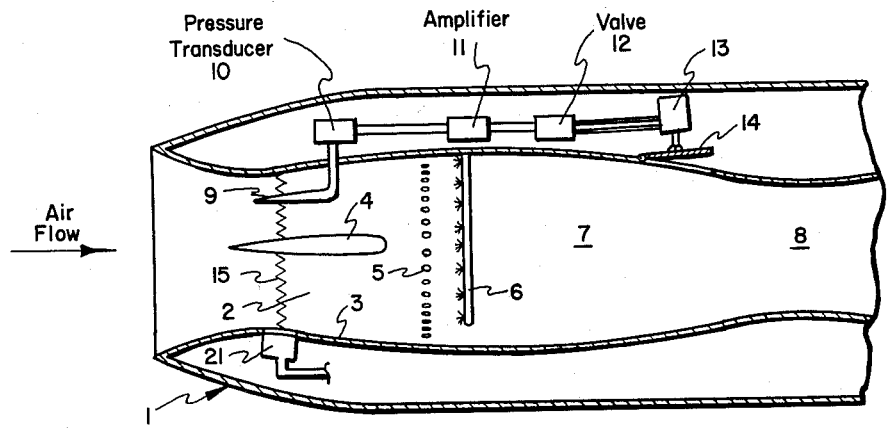
Figure 2:
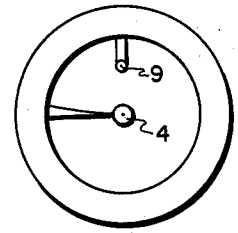
FIG. 2 is a front view of the system of this invention.

Referring to the drawing, and particularly to FIG. 1, there is shown a schematic view, partly in section, of a typical air breathing jet engine 1. In such an engine the air enters from the direction of flight of the aircraft and passes through diffuser throat 2 formed by duct wall 3 and spike 4 suspended in the divergent section of the diffuser throat. A combustible fuel is injected through orifices 5, and a flame holder 6 causes combustion of the resulting fuel-air mixture in combustion chamber 7. The burned gases exit at high velocity through nozzle 8, providing thrust. A typical device of this invention comprises conduit means such as (for example) probe 9 suspended in the airstream in the diffuser section and aligned in the direction of airflow, connected to a pressure transducer 10, the output of which is an electric signal proportional to the pressure within probe 9. This signal is connected to the input of amplifier 11 which in turn controls valve 12 connected to ram 13 which in turn is connected to open and shut bleed door 14 in combustion chamber 7. As previously disclosed, this invention also contemplates the use of a variable geometry inlet diffuser to provide the change in flow characteristics required to position the shock wave in an optimum manner. A typical shock wave position intersecting probe 9 is indicated by wavy line 15 in FIG. 1.

Figure 3:
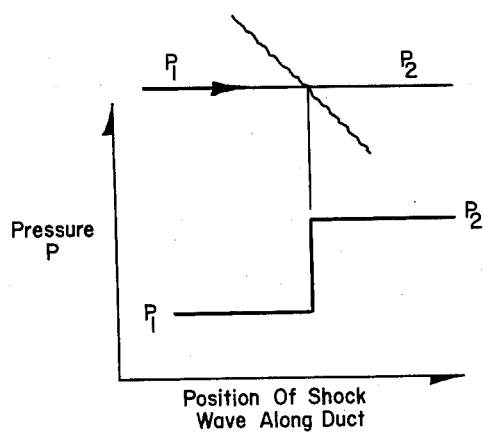
FIG. 3 is a graph showing pressure variations which occur at the shock wave.

Referring now to FIG. 3, the pressure variation which occurs at the shock wave, whether the shock wave is a normal shock wave or an oblique one, is shown. Pressure $P_1$ exists upstream from the shock wave, and $P_2$ downstream from the shock wave. The difference between these pressures is substantial and accounts for the discontinuity detected by Schlieren photographs.

Figure 4:
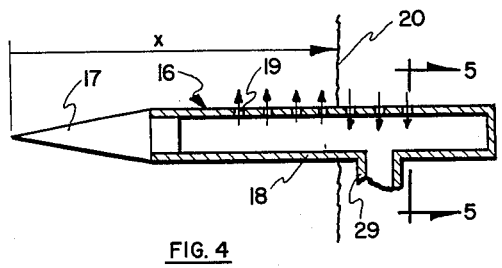
FIG. 4 is a sectional view of a first embodiment of the invention.
Figure 5:
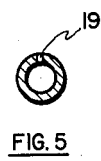
FIG. 5 is a sectional view of the device shown in FIG. 4, taken at 5—5 in FIG. 4.

Referring now to FIG. 4, there is shown a cylindrical probe 16 having a conical tip 17 and a hollow cylindrical afterbody 18 forming a chamber in which is drilled a row of orifices or holes 19 along the longitudinal axis of the probe to permit flow of air or other fluid media into and out of probe 16. A typical position of the shock wave, however, is indicated by wavy line 20 in FIG. 4.

Figure 6:
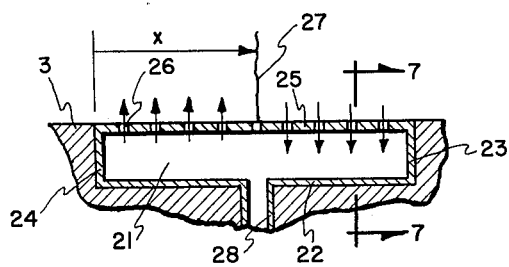
FIG. 6 is a sectional view of a second embodiment of the invention.
Figure 7:
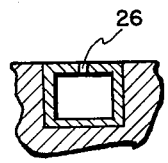
FIG. 7 is a sectional view taken at 7—7 in FIG. 6.

In FIG. 6, a chamber 21 having walls 22, 23 and 24 is installed in duct wall 3 so that cover 25 of chamber 21 is flush with the inside surface of duct wall 3. A longitudinal row of holes or conduits 26 is cut in cover 25 so that the row extends directly parallel to the direction of flow of air in the duct. The number of such holes may be varied but, of course, the larger the number of holes and the smaller they are, the more smoothly the pressure within the chamber varies with shock wave position. Shock wave 27 is shown in a typical position. Outlet duct 28 connects to pressure transducer 10 of FIG. 1, as does outlet duct 29 in FIG. 4. The position of the device of FIG. 6 in the duct is shown in FIG. 1.

In operation, it may be desirable to use a probe-type sensing device as shown in FIG. 4, or in some applications a flush or wall-type sensor, as shown in FIG. 6. Although both devices are shown in the duct of FIG. 1, it is to be understood that only one such device is necessary to obtain the new result of this invention. The operation and theory of the two devices is substantially the same, with the advantage of one over the other depending largely upon the nature of the device upon which the sensor is to be installed. The probe-type device shown in FIG. 4 is typically mounted as at 9 in FIG. 1 in the diffuser section of the duct, and should be positioned so that the desired position of the shock wave is somewhere along the length of the probe 9, for example, as shown at 20 in FIG. 4. When the shock wave is in this position, it can be seen from FIG. 4 that air flow will occur from one side of the shock wave to the other through the probe. The air flows into holes 19 located on the high-pressure side of the shock wave, and out holes 19 located on the low-pressure side of the shock wave. Since these holes are small in relation to the cross-section of the duct, a pressure drop occurs as the air flows into the probe, and another pressure drop occurs when the air flows out of the probe. Thus, the pressure within the probe is always intermediate between the pressures which exist on either side of the shock wave, and the pressure within the probe is a function of the position of the shock wave along the the axis of the probe, since obviously, the pressure in the probe will more nearly approximate the pressure which exists on the side of the shock wave to which the greatest number of holes are exposed. In FIG. 4, for example, if the shock wave is near the tip of the probe, all of the holes will be exposed to $P_2$, the pressure existent behind the shock wave. If now the shock wave moves downstream along the probe to a point or position X, measured from the tip of the probe, the holes in the extreme front end of the probe begin successively to be exposed to pressure $P_1$, which exists ahead of the shock wave. Gradually, then, the pressure within the probe changes and begins to approach $P_1$ as the shock wave moves downstream, and the pressure within the probe equals $P_1$ when all of the holes are exposed ahead of the shock wave.

The device in FIG. 6 operates in exactly the same manner, and a plot of pressure $P_s$ within the probe or within chamber 21 of FIG. 6 is shown in FIG. 8, plotted against X, the coordinate of the shock wave. Because the pressure within the probe depends upon the number of holes exposed to the air ahead of and behind the shock wave, this pressure varies linearly with shock wave position, and the electrical output of transducer 10 is linearly related to the shock wave position in the duct. This signal is amplified in amplifier 11 and is used to open or close bleed door 14 proportionally as required to restore the position of the shock wave to that desired for optimum efficiency of the power plant.

Although the present invention has been described with a certain degree of particularity, it is understood that various modifications in the details and arrangements of parts may be had without departing from the spirit and scope of the invention as hereinafter claimed.

I claim:

1. Means for locating the position of a shock wave in a fluid medium comprising conduit means intersecting said wave, orifices along said conduit means permitting flow of said medium into and out of said conduit means, and means responsive to variations in pressure in said conduit means.

2. In combination: an air-breathing power plant, a duct furnishing air to said power plant, means for detecting the position of a shock wave in the air flowing in said duct, comprising conduit means aligned in the direction of air flow, a plurality of openings along said conduit, means between said duct and said conduit means and means for measuring air pressure in said conduit means.

3. A device as recited in claim 2 and further comprising means adapted to control the position of said shock wave along said duct connected to be responsive to said means for measuring air pressure.

4. A device as recited in claim 2 and further comprising means producing an electrical signal in response to said pressure, and means for modifying flow condition within said duct in response to said signal in the sense necessary to maintain said shock wave in a fixed position.

5. In combination, a duct for receiving supersonic air flow, said duct having a converging portion and a diverging portion in which a portion of the kinetic energy of flow through said converging portion is converted into pressure energy causing a shock wave in the divergent portion of said duct, means for detecting the position of said shock wave in said duct comprising means forming a chamber adjacent said duct, a plurality of conduits connecting points in said duct with said chamber, the said points being displaced from each other longitudinally of said duct, and means for measuring pressure in said chamber.

6. Means for measuring the longitudinal position of a shock wave in the divergent portion of an aircraft engine intake duct comprising a chamber adjacent the divergent portion of said duct, a plurality of orifices spaced along a longitudinal line in the divergent portion of said duct and communicating with said chamber, and means for measuring pressure in said chamber.

7. A device as recited in claim 6 and further comprising bleed doors in said duct downstream from said orifices for relieving the pressure therein, an actuator for controlling the position of said bleed doors and electrical means responsive to said pressure measuring means for controlling said actuator to keep said shock wave in a fixed longitudinal position in said duct.

8. Means for measuring the position of a shock wave in a fluid duct comprising: means forming a chamber adjacent said duct, said chamber and duct having a common wall therebetween; a plurality of longitudinally displaced holes positioned along said common wall in the region of said shock wave and connecting points in said duct with said chamber, and means connected to measure the average pressure of fluid in said chamber.

9. Means for measuring the position of a shock wave in a fluid duct comprising: means forming conduit means adjacent said duct and intersecting shock waves in said duct; a plurality of longitudinally displaced orifices along said conduit connecting points in said duct with said conduit and adapted to permit flow of fluid into and out of said conduit means; and means connected to measure the average pressure of fluid in said conduit means.

10. A device as recited in claim 5 and further comprising: means adapted to control the position of said shock wave along said duct, connected to be responsive to said means for measuring pressure in said chamber.

11. A device as recited in claim 5 and further comprising: means for producing an electrical signal in response to said pressure, and means for modifying flow conditions within said duct in response to said signal in the sense necessary to maintain said shock wave in a fixed position.

References Cited in the file of this patent

UNITED STATES PATENTS

| | | |
|---|---|---|
| 2,182,280 | Chipley et al. | Dec. 5, 1939 |
| 2,315,756 | Warner | Apr. 6, 1943 |
| 2,551,470 | Smith | May 1, 1951 |
| 2,638,738 | Salter | May 19, 1953 |

OTHER REFERENCES

Flight: "Engine Intake Controls," by Stack, vol. 77, No. 2553, Dec. 27, 1957, pp. 1000–1002.